(12) United States Patent
Henry et al.

(10) Patent No.: US 11,613,640 B2
(45) Date of Patent: Mar. 28, 2023

(54) CROSS-LINKED THERMOPLASTIC POLYVINYLIDENE FLUORIDE COMPOSITIONS

(71) Applicant: Arkema Inc., King of Prussia, PA (US)

(72) Inventors: James J. Henry, Downingtown, PA (US); Gregory S. O'Brien, Downingtown, PA (US)

(73) Assignee: Arkema Inc., King of Prussia, PA (US)

( * ) Notice: Subject to any disclaimer, the term of this patent is extended or adjusted under 35 U.S.C. 154(b) by 5 days.

(21) Appl. No.: 17/261,187

(22) PCT Filed: Jul. 24, 2019

(86) PCT No.: PCT/US2019/043135
§ 371 (c)(1),
(2) Date: Jan. 19, 2021

(87) PCT Pub. No.: WO2020/023568
PCT Pub. Date: Jan. 30, 2020

(65) Prior Publication Data
US 2021/0277218 A1    Sep. 9, 2021

Related U.S. Application Data

(60) Provisional application No. 62/703,211, filed on Jul. 25, 2018.

(51) Int. Cl.
*C08L 27/16* (2006.01)
*B32B 5/18* (2006.01)
(Continued)

(52) U.S. Cl.
CPC ............... *C08L 27/16* (2013.01); *B32B 1/08* (2013.01); *B32B 5/18* (2013.01); *B32B 27/06* (2013.01);
(Continued)

(58) Field of Classification Search
CPC ............... C08L 27/16; C08L 2203/202; C08L 2205/025; C08L 2312/00; C08F 214/22; C08F 259/08; C08F 226/06; C08F 214/28; C08F 2800/20; C08F 2810/20; C09D 127/16; B32B 2266/0235; B32B 2457/00; B32B 2597/00; B32B 27/06; B32B 27/20;
(Continued)

(56) References Cited

U.S. PATENT DOCUMENTS 7,514,480 B2    4/2009   Mekhilef et al.
2016/0200907 A1   7/2016   Amin-Sanayei et al.
(Continued)

FOREIGN PATENT DOCUMENTS

WO    2006045630 A2    5/2006

*Primary Examiner* — Yan Lan
(74) *Attorney, Agent, or Firm* — Joanne Rossi

(57) ABSTRACT

The invention relates to polyvinylidene fluoride (PVDF) copolymer compositions that have improved crosslinking efficiency and performance. The PVDF copolymer contains a high level (>14 and preferably greater than 16 wt %) of a fluorinated comonomer, and has a high molecular weight as measured by the melt viscosity at 230° C. and 100 sec-1 of 18 to 40 kpoise. The composition can be effectively cross-linked with a low level radiation (high cross-linking efficiency). The cross-linked composition is useful in high-temperature applications, such as automotive wire and cable, and heat shrink tubing.

17 Claims, 1 Drawing Sheet

Heat aging Sample 2 copolymer after e-beam exposure (0, 3, and 6 MRad)

(51) Int. Cl.
    *B32B 27/06*     (2006.01)
    *B32B 27/20*     (2006.01)
    *B32B 27/30*     (2006.01)
    *B32B 1/08*     (2006.01)
    *C08F 214/22*     (2006.01)
    *H01B 3/44*     (2006.01)

(52) U.S. Cl.
    CPC ............ *B32B 27/20* (2013.01); *B32B 27/304* (2013.01); *C08F 214/22* (2013.01); *H01B 3/445* (2013.01); *B32B 2266/0235* (2013.01); *B32B 2457/00* (2013.01); *B32B 2597/00* (2013.01); *C08F 2800/20* (2013.01); *C08F 2810/20* (2013.01); *C08L 2203/202* (2013.01); *C08L 2205/025* (2013.01); *C08L 2312/00* (2013.01)

(58) Field of Classification Search
    CPC ..... B32B 27/304; B32B 1/08; B32B 2270/00; B32B 2307/546; B32B 2307/558; B32B 2307/712; B32B 2307/736; B32B 2571/00; B32B 27/08; B32B 27/322; B32B 5/18; B32B 5/20; B32B 5/22; B32B 5/32; H01B 3/445
    See application file for complete search history.

(56) References Cited

U.S. PATENT DOCUMENTS

| | | |
|---|---|---|
| 2016/0215133 A1 | 7/2016 | Bonnet et al. |
| 2017/0253760 A1 | 9/2017 | Zheng et al. |
| 2018/0044456 A1 | 2/2018 | Freeman et al. |

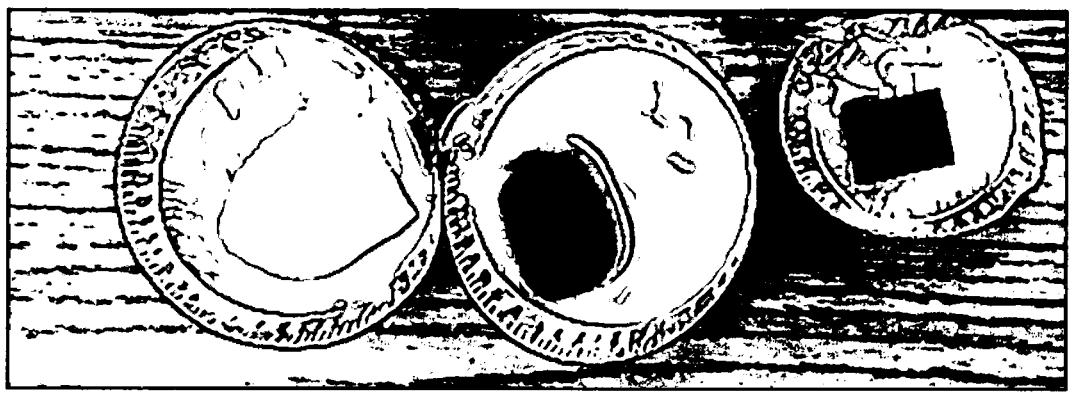
Heat aging Sample 2 copolymer after e-beam exposure (0, 3, and 6 MRad)

CROSS-LINKED THERMOPLASTIC POLYVINYLIDENE FLUORIDE COMPOSITIONS

This application is a national stage application under 35 U.S.C. § 371 of PCT Application PCT/US2019/043135, filed Jul. 24, 2019; which claims benefit to U.S. Provisional Application No. 62/703,211, filed Jul. 25, 2018; said applications incorporated herein by reference.

FIELD OF THE INVENTION

The invention relates to polyvinylidene fluoride (PVDF) copolymer compositions that have improved crosslinking efficiency and performance. The PVDF copolymer contains a high level (>14 and preferably greater than 16 wt %) of a fluorinated comonomer, and has a high molecular weight as measured by the melt viscosity at 230° C. and 100 sec$^{-1}$ of 18 to 40 kpoise. The composition can be effectively cross-linked with a low level radiation (high cross-linking efficiency). The cross-linked composition is useful in high-temperature applications (for example, above 150 C), such as automotive wire and cable, and heat shrink tubing.

BACKGROUND OF THE INVENTION

Polyvinylidene fluoride is commonly used to produce tube products for wire and cable applications, as well as for jackets and primary insulation on wire and cable products. Copper, fiber optic, and plenum cables and conduit exist in large numbers in most commercial buildings. Polyvinylidene fluoride (PVDF) is the preferred material for wire and cable applications because of its inherent toughness, inertness, and flame and smoke resistance.

PVDF thermoplastic resins in wire and cable applications have been cross-linked by e-beam radiation since the 1950's. The primary reason for crosslinking is to create a thermoset-like structure to prevent flowing or creep. This is of particular importance if the cable might experience a temperature environment above its melting point. Arkema sells several grades of Kynar® resin and Kynar Flex® resins into the "crosslinked cable" market for this purpose.

Producers, using e-beam crosslinking of PVDF face two primary challenges associated with this technology: (1) high capital cost of electron beam equipment, which increases production costs and limits production capacity and (2) degradation of certain properties after e-beam exposure. Long term color stability is known to deteriorate following e-beam exposure—which can adversely affect the ability to maintain color coding or reading embedded tapes.

The use of high e-beam doses (for example at or above 13 MRads) results in higher costs and an increase in these "negative consequences". There is a desire to lowering the e-beam dosage needed to achieve a crosslinked thermoset-like structure for lower costs and improved performance. In other words, PVDF copolymers having improved crosslink efficiency can allow for lower e-beam doses to obtain all the desired properties with less of the undesirable properties.

Cross link efficiency can be described as the amount of radiation exposure needed to achieve a desired property. In many cases, the desired property is simply to produce a product that will not flow when exposed to temperatures above its melting point. Another way to describe this is to alter the resin so that it is a thermoset meaning it will melt, but it will not flow. One way to measure cross link efficiency is to expose samples to varied levels of e-beam radiation, then perform a solvent extraction to separate the soluble fraction from the insoluble fraction. The percent by weight of insoluble fraction is often described as the percentage cross linked. As a rule of thumb, 80% insoluble fraction is typically considered to be fully crosslinked.

Another way to measure cross linking is by examining effects of e-beam exposure on rheological properties i.e. resistance to flow. PVDF copolymers used in these applications are all thermoplastic resins, and as such, they can be repeatedly melted and reformed into useful shapes. The act of cross linking changes the rheological properties of the resin to effectively convert them into a thermoset structure which can no longer be melt processed. As cross link density increases, a predictable viscosity shift can be observed as more and more crosslinks are formed. For a PVDF copolymer to be considered to have better crosslink efficiency, it should provide more significant viscosity increases and increases in storage modulus (i.e. higher % increase in viscosity and storage modulus) above its melt point, and at the same or lower e-beam exposure to accomplish this as compared to a resin which has a similar starting viscosity or modulus prior to e-beam exposure. As an example, if two PVDF copolymers have similar starting viscosities, and after exposure to a defined e-beam exposure, one of the resins has a much higher viscosity (particularly when measured in an oscillatory parallel plate rheometer at low shear rates), it is said that this resin with higher viscosity has a higher crosslink efficiency. In a more quantitative example, if these same two PVDF copolymers are exposed to different levels of radiation, and it is noted that one of the PVDF resins requires half the e-beam dosage to achieve similar viscosity shifts, it is then said that this PVDF resin exhibits twice the cross link efficiency.

One way known to increase crosslink efficiency is by introducing coagents acting as crosslink promoters. A cross link promoter increases crosslinking efficiency by allowing a crosslinked network to occur at a lower e-beam or irradiation dosage. Lower e-beam dosage in general yields a product with improved thermal stability for equivalent e-beam dosage. The PVDF resins described in the present invention are found to increase the crosslinking efficiency and thermal stability without the addition of coagents, and can further reduce e-beam dosage with the addition of coagents.

This surprisingly dramatic improvement in properties can be seen, for example, by comparing the low shear rheology or the elastic modulus/component of viscosity of the composition of the invention to a current commercial cross-linkable PVDF. The same modulus or viscosity (indicating degree of cross linking) is reached at one half the radiation dosage when compared to a current industry standard material.

There are several benefits associated with the ability to efficiently crosslink using lower e-beam dosage. One primary benefit of lower e-beam dosage is better color stability. Of primary concern, e-beam exposure significantly reduces thermal stability (color stability) of the resin. PVDF resins exposed to e-beam radiation exhibit reduced whiteness retention if later exposed to elevated temperatures. The severity of color stability degradation with temperature is often sufficient to prevent the use of PVDF resins in higher temperature environments. Reducing e-beam dose also reduces negative effects on the polymers crystal structure and associated properties changes.

Additionally, E-beam machines are extremely costly—which makes the industry highly capital intensive. By allowing more efficient cross-linking at lower dosages—this invention allows the productivity of these expensive units to increase dramatically. Perhaps even doubling the output capacity.

SUMMARY OF THE INVENTION

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

The invention, in a first aspect relates to a PVDF copolymer composition having an increased cross-linking efficiency, and to the cross-linked polyvinylidene fluoride (PVDF) copolymer composition resulting from exposure to ionizing radiation. The PVDF copolymer contains from 60 to 86 weight percent of VDF monomer units, preferably 70 to 84 weight, preferably 77 to 83 weight percent of VDF monomer units and more preferably from 78 to 82 percent of VDF monomer units, and from 14 to 35 weight percent of one or more fluorinated comonomers, preferably from 16 to 30, more preferably from 17 to 23 weight percent, and even more preferably from 18 to 22 weight percent of one or more fluorinated comonomers, wherein the melt viscosity of the PVDF copolymer prior to crosslinking is in the range of from 16 to 40 kpoise when measured at 230° C. and 100 s−1 shear rate, and preferably from 18 to 35 kpoise, more preferably from 18 and 30 kpoise, and more preferably from 22 to 29 kpoise.

In one aspect of the first aspect, the comonomer in the PVDF copolymer is hexafluoropropene.

In a third aspect, the PVDF copolymer, of the first or second aspect, in the solid state can be a homogeneous or heterogeneous morphology. The heterogeneous copolymer preferably having a melting point of greater than 160° C., prior to crosslinking. The homogeneous copolymer preferably have a melting point of from 100 C to 170 C.

In a fourth aspect, the cross-linkable PVDF composition of aspects one to three produces a cross-linked article that is clear. By clear is meant that a person can clearly see through a 0.030 inches (0.076 cm) thick (i.e. text can be read through a 0.030 thick article made of the inventive polymer).

In a fifth aspect the cross-linkable PVDF composition aspects one to four further comprises a different PVDF polymer blended with said PVDF copolymer. The composition can comprise blends of different polymers, the blend comprising the PVDF copolymer of the invention.

In a sixth aspect, the PVDF copolymer composition of any of the first five aspect further contains one or more additives selected from the group consisting of coagents, acid scavengers, fillers, fibers, colorants, carbon, silicates, antioxidants, thermal stabilizers, UV stabilizers, UV absorbers, metal oxides (and hydroxides), plasticizers, flame retardants, processing aides, lubricants, fungicides, nucleating agents as well as other miscible (such as acrylic) and immiscible polymers (such as PTFE).

In a seventh aspect, the cross-linkable PVDF composition of any of aspects 1 to 6, can be crosslinked as a result of e-beam, gamma or LED radiation.

In the eight aspect, the cross-linkable PVDF composition of any of aspects 1 to 7, is effectively crosslinking (meaning the polymer will act as a thermoset resin—it will not flow at temperatures above the melt point) by a level of radiation of less than 6 MRad, and even less than 3 MRad.

In a ninth aspect, the cross-linkable PVDF composition of aspects 1 to 8 is used to form an article formed. The article may be a wire, cable, filament, tube or sheet.

In a tenth aspect, the article of aspect nine is formed by a melt process, followed by exposure to radiation.

In a eleventh aspect, the article of aspects 9 and 10 is present in a wire and cable application as the primary insulation, strength member component, fibers, jacket, sub-tube, tube, buffer or heat shrink tubing.

The article of aspects 9-41 is formed by a coextrusion process, wherein the layer formed from the composition of the invention directly adheres to a substrate layer.

BRIEF DESCRIPTION OF THE DRAWINGS

FIG. 1: Shows the heat aging of a p(VDF/HFP) copolymer after different levels of e-beam exposure.

DETAILED DESCRIPTION OF THE INVENTION

All references listed in this application are incorporated herein by reference. All percentages in a composition are weight percent, unless otherwise indicated. Molecular weight of the copolymers of the invention is high, and therefore is measured by determining the melt viscosity according to ASTM method D-3835 measured at 230° C. and 100 sec$^{-1}$.

The term "polymer" is used to mean any of homopolymers, copolymers and terpolymers (three or more monomer units), unless otherwise stated. "Copolymer" means any polymer with 2 or more different monomer units, and can be random, blocky, or gradient, homogeneous or heterogeneous, and the polymer can be linear, branched, star-shaped, comb-shaped or of any other morphology, unless specifically noted otherwise.

"Crosslinking efficiency" is used to describe the relative number of crosslinks formed per unit dosage of radiation as measured in our case by elastic or storage modulus in the melt phase at a standard temperature of 230 C and shear rate (see below). As crosslink efficiency improves, less radiation is needed to effectively crosslink a sample. There exists several ways to measure crosslink density and crosslink efficiency in literature including solvent extraction, creep testing, dynamic mechanical analysis and rheology experiments to name the most common. In this work, rheological experiments were used to evaluate relative crosslink efficiency. The storage modulus at from oscillatory parallel plate rheology at a single shear rate (very low shear rate) was recorded with an increase in modulus signifying an increase in crosslink density. Relative values to assess effects of e-beam radiation on crosslink density could be obtained in this manner. Therefore, when a copolymer is described as having twice the crosslink efficiency, it means that the copolymer requires half the e-beam dosage to achieve the same storage modulus measured at 230'C and at a low shear rate (0.117 s−1). The copolymers of the invention have an improved crosslink efficiency, compared to current commercial radiation cross-linkable PVDF copolymers.

Weight percent of comonomer incorporated into the copolymer may be determined by F19 NMR analysis.

The invention relates to a cross-linkable composition having a high cross-linking efficiency, where the composition synergistically has both a high molecular weight and a high level of comonomer. By combining both high molecular weight and high comonomer level, a surprisingly dramatic increase in cross-linking efficiency was achieved. In some embodiments, the invention is capable of effectively crosslinking at doses of 6 MRads or less, preferably 3 MRads or less.

PVDF Copolymer

The polyvinylidene fluoride copolymer of the invention contains at least 50 weight percent, more preferably more than 60 weight percent, and more preferably greater than 70 weight percent of vinylidene fluoride monomer units. The vinylidene fluoride is copolymerized with one or more fluorinated comonomers. The fluorinated comonomers useful in the invention include, but are not limited to tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 2,3,3,3-tetrafluoropropene (FIFO-1234yf), 2-chloro-1-1-difluoroethylene (R-1122), 3,3,3-trifluoro-1-propene, 2-fluoromethyl-3,3,3-trifluoropropene, a fluorinated vinyl ether, a fluorinated allyl ether, a non-fluorinated allyl ether, a fluorinated dioxole, and combinations thereof.

Especially preferred copolymers are copolymers of VDF with HFP, TFE or CTFE.

Especially preferred terpolymers are the terpolymer of VDF, HFP and TFE, and the terpolymer of VDF, trifluoroethene, and TFE. In a preferred embodiment, the copolymer is VDF/HFP.

The fluoro-comonomer level of the composition is high, at greater than 15, more preferably greater than 16, more preferably greater than 17 weight percent, preferably 16 to 35 weight percent, and in one embodiment from 18 to 30 weight percent, and preferably 18 to 22 weight percent.

In theory, PVDF-HFP resins can be produced that stoichiometrically have a 50150 molar ratio, HFP levels in excess of 30 weight percent, being very elastomeric, and not processable by normal thermoplastic processing techniques. This invention is focused on thermoplastic semi-crystalline VDF containing copolymers. Resins having such high HFP levels are considered elastomers. The practical HFP limit for having a thermoplastic VDF copolymer is less than 33 wt %. Elastomers by definition generally have no melting point as measured by DSC. Other fluoro-comonomer could produce thermoplastic copolymers at higher comonomer levels.

The copolymers of the invention are sernicrystaline meaning they have crystalline melting points as measured by DSC.

The copolymer can have any morphology, and can be homogeneous or heterogeneous.

By a "homogeneous" copolymer is meant that a single polymer phase is present, while a "heterogeneous copolymer 2 or more phases in the solid state. The heterogeneous copolymers tend to have higher melting points and improved low temperature impact properties, while homogeneous copolymers have a higher clarity. It was found that e-beam crosslink efficiency and associated property improvements were independent of morphology.

The copolymers of the invention are high molecular weight, as measured by melt viscosity at 230° C. and 100 sec$^{-1}$. The melt viscosity is from 16 to 40 kpoise, preferably from 18 to 35 kpoise, more preferably from 18 to 30 kpoise, and most preferably from 22 to 28 kpoise. In general, the upper level for molecular weight will be constrained by the process being used to convert the resin into a useful article. In most cases for products produced in the wire and cable industry, PVDF-HFP resins are melt extruded into a variety of structures that are used in a variety of applications. Most melt extrusion processes have an upper limit for viscosity. In general, most commercial products developed using the technology of the present invention would have a melt viscosity at or below 30 kpoise, and more likely be in the range of 22 to 28 kpoise (@230° C. and 100 s−1). It is believed that cable customers would have difficulty processing resins above this viscosity ranges.

Other melt processes are capable of processing resins of any molecular weight including resins that are considered non-flowing. It is conceivable that this invention could be practiced with extremely high viscosities if such processes were being considered.

The copolymers of the invention can be produced by any means known in the art, including solution, suspension and emulsion polymerization. Molecular weight is controlled by the process conditions and the use of chain transfer agents, as known in the art.

In one embodiment, the copolymer of the invention can be blended with a PVDF homopolymer, or a PVDF copolymer having the same or different composition, and the same or different molecular weight and morphology. One example includes blending the high MFP, high molecular weight PVDF-HFP, with a lower molecular weight PVDF homopolymer or copolymer, to increase the flexibility of an article made from the composition. For example the high HFP, high molecular weight PVDF-HFP copolymer of the invention can be blended with a PVDF homopolymer such to increase flexural modulus and abrasion resistance. Another example would be to blend with a different PVDF copolymer to lower modulus. Another example would be to blend with a lower viscosity PVDF resin to improve surface finish (shiny surface) of extruded articles.

Additives

Additives typically used in PVDF compositions, may be added to the composition at low levels of generally less than 10 weight percent, less than 5 percent, less than 3 percent, and as low as 10 ppm, based on the weight of the copolymer. Useful additives including but not limited to coagents (crosslink promoters), acid scavengers, fillers, fibers, colorants, carbon, silicates, antioxidants, thermal stabilizers, UV stabilizers, UV absorbers, metal oxides (and hydroxides), plasticizers, flame retardants, processing aides, lubricants, fungicides, nucleating agents as well as other miscible (such as acrylic). Coagents are generally used at from 1 to 6 percent, based on the polymer solids, more preferably from 2 to 4 weight percent. Useful coagents or crosslink promoters include, but are not limited to: triallyl isocyanurate (TAIC), tribally cyanurate (TAC) and silanes Radiation Cross-Linking The crosslinking of the PVDF copolymer occurs on exposure to radiation. Useful radiation includes gamma, e-beam and LED radiation. While "e-beam" is used throughout this application, and is the preferred radiation for the crosslinking reaction of the PVDF copolymers, it is understood that gamma and LED radiation can also be used in the practice of the invention.

In general, the PVDF composition of the invention is formed into an article by a typical process, general a melt process such as extrusion, coextrusion, injection molding, foaming.

To explain the relationship between e-beam exposure and post thermal stability, it is useful to understand how e-beam exposure effects the polymer. During the e-beam crosslinking process, the PVDF resin forms reactive free radicals along the PVDF chains. When these free radicals are in close proximity to each another, they can form crosslinks that bind individual chains together Crosslinking is the desired consequence of exposing PVDF resins to e-beam radiation. The crosslinking process, however, is far from "100%" efficient, and stable free radicals are reported to remain on the polymer chain uncrosslinked. These uncrosslinked free radicals are described in literature as stable and capable of existing long after completion of e-beam exposure. These uncrosslinked free radicals do not impart any favorable properties, and conversely, can introduce negative consequences on final properties.

As a specific example, the presence of unreacted free radicals is believed responsible for lowering the resin's color stability. When an e-beam crosslinked PVDF resin is exposed to elevated temperatures, especially in the presence of oxygen, further reactions are known to occur (and believed responsible in part for discoloration and darkening the resin). This problem, by itself, often prevents use of crosslinked MIN' resins in elevated temperature environments. By improving crosslink efficiency, and lowering the effective e-beam dose, it is expected that the resin will experience less damage, and as would be expected, less property losses.

As a specific PVDF examples color stability after thermal exposure is found to be reduced by exposure to e-beam radiation with severity proportional to ebeam exposure. PVDF-HFP copolymers exposed to 3 MRads e-beam radiation would yellow after thermal exposure to 180° C. for 24 hours. These same PVDF samples not exposed to ebeam radiation only experienced a minor color shift under the same thermal exposure. When examining higher levels of ebeam exposure of 6 Mrads, these same PVDF samples were found to turn black after the same level of thermal exposure.

While typical levels of e-beam radiation used commercially range from 6 to 20 MRad, the composition of the invention was found to achieve an effective level of crosslinking when exposed to 6 MRad, and more preferably 3 MRad, and even as low as 1 MRad. Since the effective ebeam dose for the improved PVDF-HFP copolymer of this invention is expected to reduce to half that currently used, thermal stability improvements are an expected benefit for the new composition. An example of the effects of ebeam exposure on color shifts after thermal testing can be found in FIG. 1. In FIG. 1, the sample with zero e-beam exposure is white; the sample with 3 MRad exposure is light brown to carmel color; and the sample with 6 MRad exposure is very dark brown.

Use

The crosslinkable composition of the invention is useful for articles that will be used in high temperature applications, where the polymer is exposed to temperatures above its melting temperature. Uses include wire and cable construction, including as the primary insulation, strength member component, fibers, jacketing, sub-tube, tube, buffer or heat shrink tubing. In one embodiment, the PVDF copolymer is foamed with either a gaseous or chemical foaming agent. The foam could be applied onto a wire—or calendared into a tube or conduit, then radiation cross-linked.

In another embodiment, a film can be extruded, then cross linked. A thin extruded film can be laminated adhered or coextruded onto a substrate, then crosslinked, to form a highly weatherable and tough surface. Protective layers on polymer decking, vinyl siding, and photovoltaic backsheets, are some expected uses.

In another embodiment, a tube is produced and then e-beam cross linked to form a thermoset structure. The tube is then expanded at temperatures below the melting point of the resin to form an expanded structure. This tube, if later heated, will shrink back to its original dimensions prior to the expansion. This technology is commonly referred to as heat shrink tubing.

In another embodiment, the PVDF copolymer of this invention is used as jacket or insulation in a cable structure, and can be in the form of a single or multilayered construction. The cable, once produced, is exposed to e-beam radiation to cross link the resin as a jacket or insulation. The crosslinked PVDF copolymer will now provide thermoset like properties such as resistance to flow at temperatures above the melting point of the resin. The crosslink process is commonly used to gain adhesion between individual layers in a multilayered construction which is further improved with the addition of a crosslink promoter.

In another embodiment, a PVDF copolymer of this invention could be formed into a solid or foamed sheet that can be e-beam crosslinked to form a thermoset structure. This product can then be further processed by thermoforming to achieve a desired shape or form.

In another embodiment, a PVDF copolymer of this invention could be used to produce a gasket, diaphragm or other flexible product needing high creep resistance. Such products can be produced using a wide variety of methods including injection molding, extrusion, compression molding, transfer molding, machining and die cutting.

The copolymer can be formed into a final article by any known means, with extrusion or coextrusion being a preferred method for forming wire and cable components. After extrusion the article can be subjected to radiation to crosslink forming a thermoset structure.

EXAMPLES

In general, the PVDF-HFP copolymer samples used in the Examples varied in HFP contents, molecular weights and morphologies. Samples 2, 3, 4 and 5 are commercial products, and Sample 1 is a composition of the invention. For these samples, the viscosity will be considered "High" if between 22 and 25 Kpoise and "Low" if between 6 and 9 Kpoise. HIT content can also be described in a similar fashion with the HFP content identified as "High" if it contains between 18 and 22 percent HFP and "Medium" if between 8 and 10 percent.

Test method for crystalline melting point: DSC test conditions using 3 to 10 mg samples—The samples were heated at 10° C./min and cooled 10° C./min from −20° C. to 210° C., then reheated again at 10 C a min. The melting point is considered the peak temperature on DSc curve.

TABLE 1

PVDF-HFP Resin Summary

| SAMPLE | HFP Level (wt. percent) | Viscosity (Kp) | Morphology | Melting Point (° C.) |
|---|---|---|---|---|
| 1 | 18 to 22 | 22 to 25 | Heterogeneous | 163 |
| 2 (comparative) | 18 to 22 | 6 to 9 | Homogeneous | 123 |
| 3(comparative) | 8 to 10 | 6 to 9 | Heterogeneous | 166 |
| 4(comparative) | 8 to 10 | 22 to 25 | Heterogeneous | 164 |
| 5(comparative) | 18 to 22 | 6 to 9 | Heterogeneous | 168 |

The samples were prepared in a Brabender set at standard conditions (205° C., 45 rpm, 10 minutes, kneading rotors, 60 gram sample size) and were prepared either with or without a coagent triallyl isocyanurate (TAIC). The sample resins, while still molten, were removed from the Brabender bowl and immediately compression molded into disks of various sizes using a standard compression molding profile (230° C., 10,000 psi, 3 to 5 minutes). The disks, once cooled, were divided into two groups with one group exposed to 3 and 6 MRads e-beam. These samples were evaluated by parallel plate with complex viscosity, loss modulus and storage modulus being recorded (and compared to unexposed samples). Dynamic (rotational) frequency sweep tests were performed at 230° C. using an Anton Paar MCR500 rheometer with 25 mm parallel plates and 1 mm gap. Frequency sweep tests are performed at the shear rates of 0.01 rad/s-500 rad/s using a strain amplitude within the linear viscoelastic region.

Crosslinking was evaluated by observing the increase in dynamic viscosity and elastic/storage modulus after e-beam exposure in a parallel plate oscillatory rheometer. Higher viscosity especially at low strain rates (0.117 s−1) indicated a higher degree of cross-linking. After completion of individual experiments, results were compared to better understand relationship between PVDF-HFP resin composition and relative viscosity.

Example 1

In the following example, both materials are "high" molecular weight materials by our definition. Sample 1 is the high MW, high comonomer content material of this invention. Sample 4 is an equivalent high MW copolymer, but does not have the high comonomer content. The improvement in cross-linking efficiency is surprising and dramatic.

The effect of radiation dosage on complex viscosity for Sample 4 resin compared to the Sample 1 (with no TAIC introduction) can be found in the following Table 2. At 3 Mrad the invention material (Sample 1) showed a greater storage modulus and complex viscosity than the equivalent MW copolymer.

TABLE 2

Sample 1 vs. Sample 4, Storage and Loss Modulus @ 0.117 s-1, No TAIC

| Sample | E-beam Dosage (MRads) | Storage Modulus (KPa) | Loss Modulus KPa | Complex Viscosity KPa-s |
|---|---|---|---|---|
| Sample 1 | 0 | 8.29 | 8.4 | 101 |
|  | 3 | 20.3 | 10.1 | 194 |
|  | 6 | 40.5 | 10.3 | 357 |
| Sample 4 (comparative) | 0 | 9.19 | 7.95 | 104 |
|  | 3 | 9.19 | 6.96 | 99 |
|  | 6 | 14.3 | 7.79 | 139 |

The starting viscosity profiles for the two samples Sample 1 and the Sample 4 (@0 MRads radiation) were nearly identical. After exposing both materials to 3 MRads of radiation, the storage modulus increase and viscosity increase for the Sample 1 was more significant then for Sample 4. This relationship was also observed for samples exposed to 6 MRads radiation. Of interest, we found that for the Sample 1, a radiation dosage of 3 Mrads produced a higher storage modulus and complex viscosity then for the Sample 4 resin exposed to the higher radiation dosage of 6 MRad.

Example 2

The same two materials as in example 1—were formulated with 3% tri-allyl isocyanurate (TRIC) to enhance crosslinking efficiency. Once again the increase in crosslinking efficiency for Sample 1 of this invention, was dramatically improved compared with the control high molecular weight copolymer labeled Sample 4. Surprisingly, Sample 1 exposed to 3 MRads of radiation produced the same storage modulus and complex viscosity profile as for the Sample 4 after a higher 6 MRads of radiation.

A comparison of the storage and loss modulus for Sample 4 and Sample 1 (collected at a low shear rate of 0.117 s−1) can be found in Table 3.

TABLE 3

Sample 4 vs. Sample 1, Storage/Loss Modulus @ 0.117 s-1, with 3% TAIC

| Material | E-beam Dosage MRads | Storage Modulus KPa | Loss Modulus KPa | Complex Viscosity KPa-s |
|---|---|---|---|---|
| Sample 1 | 0 | 7.1 | 7.4 | 87.6 |
|  | 3 | 186 | 24.9 | 1610 |
|  | 6 | 300 | 31.0 | 2580 |
| Sample 4 (comparative) | 0 | 7.0 | 6.5 | 81.6 |
|  | 3 | 82.1 | 15.6 | 714 |
|  | 6 | 179 | 30.9 | 1550 |

Once again, the viscosity of the Sample 1 exposed to 3 MRads of radiation had the same viscosity as the Sample 4 after a higher 6 MRads exposure. In other words, the Sample 1 required half the radiation dosage needed to achieve a similar cross link density.

Example 3

In this example, both resins are heterogeneous PVDF-HFP copolymers and both contained 3% TRIC. Sample 5 has the comonomer content of this invention, but not the high molecular weight. Sample 3 has an HFP content equal to the inventive polymer (Sample 1) but with an equivalent molecular weight to Sample 5. As observed in the previous example, higher HFP containing Sample 5 resin crosslinked more efficiently than lower HFP containing Sample 3 resin. Both samples had 3% TAIC formulated into the copolymers to increase crosslinking efficiency. The results are shown in Table 4 below.

What is interesting to note here is that neither material reached complex viscosity and storage modulus reached by the invention material (Sample 1) at 3 MRad even after 6 MRad of e-beam shown in Table 3 This confirms the need for both high HIT and high MW for optimum performance.

TABLE 4

Sample 3 vs. Sample 5, Storage/Loss Modulus @ 0.117 s-1, with 3% TAIC

| Material | E-beam Dosage MRads | Storage Modulus KPa | Loss Modulus KPa | Complex Viscosity KPa-s |
|---|---|---|---|---|
| Sample 3 (comparative) | 0 | 0.7 | 1.1 | 10.9 |
|  | 3 | 23.5 | 1.7 | 210 |
|  | 6 | 80.9 | 12.6 | 700 |
| Sample 5 (comparative) | 0 | 0.1 | 0.3 | 3.1 |
|  | 3 | 26.5 | 5.8 | 232 |
|  | 6 | 114 | 17.5 | 983 |

Example 4

This directly compares the invention material (Sample 1) with a copolymer of equivalent comonomer content, but lower molecular weight (Sample 5). We examined these two polymers crosslinking efficiency with and without the addition of 3% TAIC with both 3 and 6 Mrad of e-beam dosage. When tested without TAIC, Sample 5 never able to achieved the starting viscosity of the invention material (Sample 1). The results for samples tested without TAIC can be found in Table 5.

TABLE 5

Sample 1 vs. Sample 5, Storage/Loss Modulus @ 0.117 s-1, without TAIC

| Material | Ebeam Dosage MRads | Storage Modulus KPa | Loss Modulus KPa | Complex Viscosity KPa-s |
|---|---|---|---|---|
| Sample 1 | 0 | 8.29 | 8.4 | 101 |
|  | 3 | 20.3 | 10.1 | 194 |
|  | 6 | 40.5 | 10.3 | 357 |
| Sample 5 (comparative) | 0 | 0.22 | 0.44 | 4.21 |
|  | 3 | 0.64 | 0.93 | 9.64 |
|  | 6 | 3.24 | 2.18 | 33.4 |

When tested with TAIC, as noted earlier, the trends observed were similar to those generated without TAIC addition but with much higher viscosities after ebeam exposure. The presence of TAIC provided a more significant viscosity increase for the lower molecular weight Sample 5 resin compared to the Sample 1. Of interest, the addition of TAIC appears to allow for lower molecular weight resins to be more capable of achieving high levels of crosslinking. However, Sample 1 resin still provided a higher viscosity after 3 MRads of radiation than the Sample 5 resin had achieved after 6 MRads of e-beam radiation. The storage modulus and complex viscosity of Sample 5 even at 6 MRad never reached that of the invention material (Sample 1) at 3 MRad. A summary of these results with TAIC can be viewed in Table 6.

TABLE 6

Sample 5 vs. Sample 1, Storage/Loss Modulus @ 0.117 s-1, with 3% TAIC

| Material | E-beam Dosage MRads | Storage Modulus KPa | Loss Modulus KPa | Complex Viscosity KPa-s |
|---|---|---|---|---|
| Sample 1 | 0 | 7.1 | 7.4 | 87.6 |
|  | 3 | 186 | 24.9 | 1610 |
|  | 6 | 300 | 31.0 | 2580 |
| Sample 5 (comparative) | 0 | 0.15 | 0.3 | 3.1 |
|  | 3 | 26.5 | 5.8 | 232 |
|  | 6 | 114 | 17.5 | 983 |

Example 5

In this example, the invention material (Sample is directly compared with Sample 2 with both samples having high HIS P contents and with TAIC addition. The primary differences between these samples is that Sample 1 is a heterogeneous and high viscosity and Sample 2 is homogeneous and medium viscosity. Sample 1 was found to have a significantly higher complex viscosity and Storage Modulus when comparing samples exposed to 3 or 6 MRads radiation. The results of this comparison can be found in Table 7

TABLE 7

Sample 1 vs. Sample 2, Storage/Loss Modulus @ 0.117 s-1, with 3% TAIC

| Material | Ebeam Dosage MRads | Storage Modulus KPa | Loss Modulus KPa | Complex Viscosity KPa-s |
|---|---|---|---|---|
| Sample 1 | 0 | 7.1 | 7.4 | 87.6 |
|  | 3 | 186 | 24.9 | 1610 |
|  | 6 | 300 | 31.0 | 2580 |
| Sample 2 (comparative) | 0 | 0.06 | 0.6 | 5.3 |
|  | 3 | 7.1 | 14.4 | 617 |
|  | 6 | 1173 | 58.6 | 1570 |

What is claimed is:

1. A cross-linkable polyvinylidene fluoride (PVDF) composition comprising a PVDF copolymer, and said PVDF copolymer comprises from 70 to 84 weight percent of VDF monomer units, and from 16 to 30 weight percent of one or more fluorinated comonomers, wherein the melt viscosity of the PVDF copolymer prior to crosslinking is in the range of from 22 to 29 kpoise when measured by ASTM method D-3835 at 230° C. and 100 s−1 shear rate, and wherein said PVDF copolymer is thermoplastic, wherein the copolymer has a heterogeneous morphology, and has a melting point of greater than 160° C., prior to crosslinking.

2. The cross-linkable PVDF composition of claim 1, wherein said comonomer comprises hexafluoropropene.

3. The cross-linkable PVDF composition of claim 1, wherein said copolymer has a heterogeneous morphology in the solid state.

4. The cross-linkable PVDF composition of claim 1, further comprising a different PVDF polymer blended with said PVDF copolymer.

5. The cross-linkable PVDF composition of claim 1, further comprising one or more additives selected from the group consisting of coagents, acid scavengers, fillers, fibers, colorants, carbon, silicates, antioxidants, thermal stabilizers, UV stabilizers, UV absorbers, metal oxides (and hydroxides), plasticizers, flame retardants, processing aides, lubricants, fungicides, nucleating agents, miscible polymers and immiscible polymers.

6. The cross-linkable PVDF composition of claim 1, wherein said composition can form crosslinks as a result of e-beam, gamma or LED radiation.

7. The cross-linkable PVDF composition of claim 6, wherein the composition can be effectively crosslinked using 6 MRad or less of radiation.

8. The cross-linkable PVDF composition of claim 6, wherein the composition can be effectively crosslinked using 3 MRad of less of radiation.

9. An article formed from the cross-linkable PVDF composition of claim 1, wherein said article is in the form or a wire, cable, filament or sheet.

10. The article of claim 9, wherein said article is formed by a melt process, followed by exposure to radiation.

11. The article of claim 10, wherein said crosslinks are formed as a result of e-beam, gamma or LED radiation.

12. The article of claim 9 wherein the level of radiation used to form the effective crosslinking is 6 MRad or less.

13. The article of claim 9 wherein the level of radiation used to form the effective crosslinking is 3 MRad or less.

14. The article of claim 9, wherein the cross-linkable PVDF composition is present in the wire and cable application as the primary insulation, strength member component, fibers, jacket, sub-tube, tube, buffer or heat shrink tubing.

15. The article of claim 9, formed by a coextrusion process, wherein the layer formed from the cross-linkable PVDF composition directly adheres to a substrate layer.

16. A method of forming the article of claim 9, the method comprising providing a thermoplastic cross-linkable polyvinylidene fluoride (PVDF) composition comprising a polyvinylidene copolymer having 16 wt percent or more comonomer wherein the melt viscosity of the PVDF copolymer prior to crosslinking is in the range of from 22 to 29 kpoise when measured at 230° C. and 100 s−1 shear rate, melt processing the cross-linkable polyvinylidene fluoride (PVDF) composition to form a shape, exposing the formed shape to radiation.

17. The method of claim 16, wherein said copolymer has a heterogeneous morphology in the solid state.

* * * * *